UNITED STATES PATENT OFFICE.

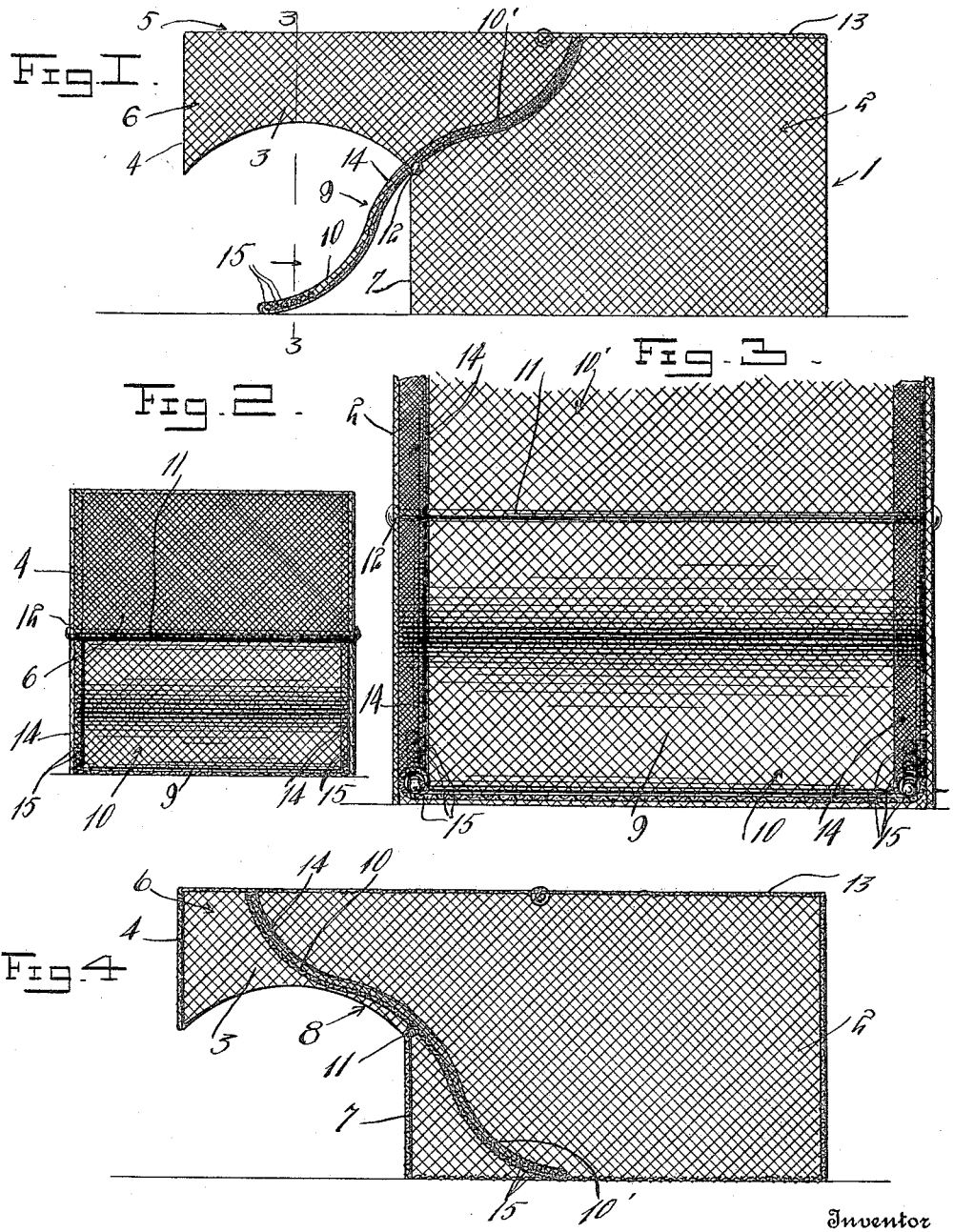

GEORGE W. STITH, OF CLARKSVILLE, OKLAHOMA.

HEN'S NEST.

1,229,164.  Specification of Letters Patent.  Patented June 5, 1917.

Application filed March 19, 1913, Serial No. 755,477. Renewed October 2, 1916. Serial No. 123,448.

*To all whom it may concern:*

Be it known that I, GEORGE W. STITH, a citizen of the United States, residing at Clarksville, in the county of Wagoner, State of Oklahoma, have invented certain new and useful Improvements in Hens' Nests; and I do hereby declare the following to be a full, clear, and exact description of the invention, such as will enable others skilled in the art to which it appertains to make and use the same.

The present invention is directed to improvements in hens' nests.

The invention has for its object to construct a device of this character with a tilting platform which will permit the fowl to enter the nest and leave the same with ease.

A further object of the invention is to so construct a platform that after a hen has entered the nest the doorway thereof will be closed so as to protect the hen from intrusion.

A still further object of the invention is to produce a platform of this character formed from wire mesh so that the fowl may find an efficient foot grip while passing thereover while entering the nest, and when the doorway is closed by the platform air will be permitted to enter through the meshes of the platform.

With these and other objects in view, this invention resides in the novel features of construction, formation, combinations and arrangement of parts to be hereinafter more fully described, claimed and illustrated in the accompanying drawing, in which:—

Figure 1 is a side elevation of the device, the platform being shown in a position previous to the entrance of the fowl.

Fig. 2 is a front view.

Fig. 3 is an enlarged transverse sectional view.

Fig. 4 is a longitudinal sectional view showing the platform in a position after the fowl has entered the nest.

Referring to the drawing, the numeral 1 designates a nest box, which is preferably rectangular in shape and has its side walls 2 provided with extensions 3, said extensions having their outer end connected by the flange 4, which is formed integral with the forward end of the top 5, thus providing an overhanging hood 6, all of which are formed from wire mesh.

Extending transversely of the box 1 and having its opposite ends connected to the sides 2 is a strip 7, said strip being of less height than the side wall thus providing an entrance 8, through which the fowl passes to gain access to the interior of the box 1.

The platform 9 is formed from a rectangular sheet of comparatively heavy galvanized wire mesh, the same being bent transversely at its center to form downwardly curved portions 10 and 10'.

Fixed to the central portion of the platform 9, and transversely thereof is a shaft 11, the opposite ends of which are pivotally mounted in the bearing openings 12 formed in the side walls 2 of the box and slightly above the upper edge of the strip 7, thereby balancing the portions 10 and 10'.

Assuming that the platform is in the position as shown in Fig. 1, and the fowl travels from the platform 10 and onto the portion 10', the weight of the fowl will cause the latter portion to move downwardly until the edge thereof rests upon the floor or ground, thus raising the portion 10 until the forward edge thereof engages the top of the hood 6, said portion when in this position preventing another fowl from entering the nest. Further it will be noted that the hood 6 serves to protect the platform after the fowl has operated the same to close the entrance opening 8.

It is obvious that when the fowl desires to leave the nest the platform will rock so that the fowl may pass over the same and leave the platform in the position as shown in Fig. 3.

By forming the platform from wire mesh it is obvious that the fowl when passing thereover will have an efficient foot hold and when the doorway 8 is occupied by the portion 10 the box will be thoroughly aired and ventilated.

Hingedly connected to the top 5 is a cover 13, which is operable to permit access to the box for removing the eggs.

As the box 1 is bottomless it is obvious that the same may be raised so as to change the nest straw.

The platform 9 has its side edges bent so as to form tubes 14, and in which are placed a plurality of ball weights 15, which are adapted to travel in the tubes so as to counterbalance the platform during the time the fowl is passing in or out of the nest.

What is claimed is:—

A hen's nest comprising a housing having an entrance formed in one end, the upper portion of said housing being extended at the entrance end to form an overhang disposed entirely outside of the limits of the bottom of the housing, and a platform having its central portion pivotally mounted in the lower portion of the entrance whereby one end of the platform will operate within the housing and the other end within the limits of the overhang, the first named end of the platform being engageable with the top and bottom of the housing in different positions thereof respectively, and the second named end of the platform being engageable with the ground and the top of the overhang in different positions.

In testimony whereof, I affix my signature, in the presence of two witnesses.

GEORGE W. STITH.

Witnesses:
 Hy Bauka,
 D. W. Capps.